United States Patent
Xu et al.

(10) Patent No.: US 9,807,451 B2
(45) Date of Patent: Oct. 31, 2017

(54) HIGH-DEFINITION MULTIMEDIA INTERFACE HDMI UNIT AND MULTIMEDIA TERMINAL

(71) Applicant: Huawei Device Co., Ltd., Shenzhen (CN)

(72) Inventors: Yingqi Xu, Wuhan (CN); Zhiqin He, Shenzhen (CN); Cunzhi Fan, Shenzhen (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 142 days.

(21) Appl. No.: 14/828,822

(22) Filed: Aug. 18, 2015

(65) Prior Publication Data
US 2015/0358675 A1    Dec. 10, 2015

Related U.S. Application Data

(63) Continuation of application No. PCT/CN2014/074295, filed on Mar. 28, 2014.

(30) Foreign Application Priority Data

Apr. 2, 2013  (CN) .......................... 2013 1 0112980

(51) Int. Cl.
G06F 3/00 (2006.01)
H04N 21/4363 (2011.01)
(Continued)

(52) U.S. Cl.
CPC ....... *H04N 21/43635* (2013.01); *H04N 5/268* (2013.01); *H04N 5/63* (2013.01);
(Continued)

(58) Field of Classification Search
None
See application file for complete search history.

(56) References Cited

U.S. PATENT DOCUMENTS 8,042,145 B2 * 10/2011 Vergoossen ............ H04N 7/163
                                                                725/151
8,242,803 B2 *  8/2012 Wu ........................ G09G 5/006
                                                                326/30
(Continued)

FOREIGN PATENT DOCUMENTS

CN          201349268 Y       11/2009
CN          101682746 A       3/2010
(Continued)

OTHER PUBLICATIONS

Partial English Translation and Abstract of Japanese Patent Application No. JPA2009060204, Jan. 16, 2017, 19 pages.
(Continued)

*Primary Examiner* — Henry Tsai
*Assistant Examiner* — Aurangzeb Hassan
(74) *Attorney, Agent, or Firm* — Conley Rose, P.C.

(57) ABSTRACT

The high-definition multimedia interface (HDMI) unit includes a source interface module, configured to communicate with a sink device, a sink interface module, configured to communicate with a source device, an interface circuit module, configured to connect to an HDMI interface of an external device, a processing module, configured to identify a device type of the connected external device, and control a switching circuit module, and the switching circuit module, configured to establish a connection between the HDMI interface of the external device connected to the interface circuit module and the source interface module or the sink interface module. It is implemented that when a different type of a device connected to a multimedia terminal matches a port, it is ensured that the multimedia terminal establishes a connection to a source device or a sink device.

18 Claims, 1 Drawing Sheet

(51) Int. Cl.
- *H04N 5/63* (2006.01)
- *H04N 5/268* (2006.01)
- *H04N 5/765* (2006.01)
- *G06F 13/40* (2006.01)
- *G06F 3/06* (2006.01)

(52) U.S. Cl.
CPC ............. *H04N 5/765* (2013.01); *G06F 3/067* (2013.01); *G06F 3/0635* (2013.01); *G06F 13/4022* (2013.01); *G09G 2370/12* (2013.01)

(56) References Cited

U.S. PATENT DOCUMENTS

| | | | |
|---|---|---|---|
| 8,286,210 B2 * | 10/2012 | Boyden | G09G 5/006 710/1 |
| 8,429,713 B2 * | 4/2013 | Candelore | H04N 21/43615 348/558 |
| 8,510,798 B2 * | 8/2013 | Candelore | H04N 7/163 380/241 |
| 8,654,767 B2 * | 2/2014 | Shao | H04N 21/4302 370/389 |
| 8,810,732 B1 * | 8/2014 | Bozarth | H04N 5/268 348/555 |
| 8,832,844 B2 * | 9/2014 | Yu | H04N 5/268 726/26 |
| 2009/0015723 A1 | 1/2009 | Doumuki | |
| 2010/0329339 A1 | 12/2010 | Kanagawa | |
| 2011/0084685 A1 * | 4/2011 | Zhong | G06F 1/3203 324/76.11 |
| 2011/0316962 A1 | 12/2011 | Doi et al. | |
| 2012/0036284 A1 | 2/2012 | Tao et al. | |

FOREIGN PATENT DOCUMENTS

| | | |
|---|---|---|
| CN | 201927859 U | 8/2011 |
| CN | 102422638 A | 4/2012 |
| CN | 102572352 A | 7/2012 |
| EP | 2385517 A1 | 11/2011 |
| JP | 2009060204 A | 3/2009 |
| JP | 2012105011 A | 5/2012 |
| JP | 2012199643 A | 10/2012 |
| WO | 2012135626 A2 | 10/2012 |

OTHER PUBLICATIONS

Partial English Translation and Abstract of Japanese Patent Application No. JPA2012105011, Jan. 16, 2017, 25 pages.

Foreign Communication From a Counterpart Application, Chinese Application No. 2016-503532, Chinese Office Action dated Nov. 22, 2016, 5 pages.

Foreign Communication From a Counterpart Application, Chinese Application No. 2016-503532, English Translation of Chinese Office Action dated Nov. 22, 2016, 5 pages.

Partial English Translation and Abstract of Chinese Patent Application No. CN201927859, Jan. 13, 2016, 4 pages.

Foreign Communication From a Counterpart Application, Chinese Application No. 201310112980.X, Chinese Office Action dated Nov. 30, 2015, 8 pages.

Foreign Communication From a Counterpart Application, European Application No. 14778968.9, Extended European Search Report dated Nov. 17, 2015, 7 pages.

Foreign Communication From a Counterpart Application, PCT Application No. PCT/CN2014/074295, English Translation of International Search Report dated Jun. 30, 2014, 2 pages.

Foreign Communication From a Counterpart Application, PCT Application No. PCT/CN2014/074295, English of Written Opinion dated Jun. 30, 2014, 9 pages.

* cited by examiner

HIGH-DEFINITION MULTIMEDIA INTERFACE HDMI UNIT AND MULTIMEDIA TERMINAL

CROSS-REFERENCE TO RELATED APPLICATION

This application is a continuation of International Application No. PCT/CN2014/074295, filed on Mar. 28, 2014, which claims priority to Chinese Patent Application No. 201310112980.X, filed on Apr. 2, 2013, both of which are hereby incorporated by reference in their entireties.

TECHNICAL FIELD

The present disclosure relates to communications technologies, and in particular, to a high-definition multimedia interface (HDMI) unit and a multimedia terminal.

BACKGROUND

On a conventional multimedia terminal, there are generally two or even more HDMI interfaces; some HDMI interfaces can only be used to connect to a source device, for example, a set top box (STB), and some HDMI interfaces can only be used to connect to a sink device, for example, a television (TV).

An HDMI interface, connected to a source device, of a multimedia terminal and an interface, connected to a sink device, of the multimedia terminal are structurally the same; and if a type of a connected device does not match a port type, a connection between the multimedia terminal and the source device or the sink device cannot be established, bringing inconvenience to a user.

SUMMARY

The present disclosure provides a HDMI unit and a multimedia terminal, to resolve a problem that a multimedia terminal cannot establish a connection to a source device or a sink device when a type of a device connected to the multimedia terminal does not match a port type.

According to a first aspect, the present disclosure provides a high-definition multimedia HDMI unit, including a source interface module, a sink interface module, an interface circuit module, a processing module, and a switching circuit module, where the source interface module is configured to communicate with a sink device, the sink interface module is configured to communicate with a source device, the interface circuit module is configured to connect to an HDMI interface of an external device, the processing module is configured to identify a device type of the external device connected to the interface circuit module, and control the switching circuit module according to the identified device type, and the switching circuit module is configured to: under control of the processing module, establish a connection between the HDMI interface of the external device connected to the interface circuit module and the source interface module, or establish a connection between the HDMI interface of the external device connected to the interface circuit module and the sink interface module.

In a first possible implementation manner of the first aspect, the interface circuit module includes a power supply submodule configured to connect to a power port on the HDMI interface of the external device, to provide a constant voltage for the HDMI interface of the external device, and a detection submodule configured to separately connect to an hot plug detection (HPD) pin on the HDMI interface of the external device and the processing module, to output a level signal that is from the HPD pin of the external device to the processing module.

According to the first possible implementation manner of the first aspect, in a second possible implementation manner, the processing module is configured to: acquire the level signal that is from the HPD pin by using the detection submodule; and if a level of the level signal is less than or equal to a first preset threshold, identify the external device as being of a source device type, and control the switching circuit module to connect a data port of the HDMI interface of the device to the sink interface module, or if a level of the level signal is greater than or equal to a second preset threshold, identify the external device as being of a sink device type.

According to the first possible implementation manner of the first aspect and the second possible implementation manner of the first aspect, in a third possible implementation manner, the processing module is further configured to: if the external device is identified as being of the source device type, control the switching circuit module to establish a connection between the data port of the HDMI interface of the external device and the sink interface module, or if the level of the level signal is greater than or equal to the second preset threshold, identify the external device as being of the sink device type, and control the switching circuit module to establish a connection between the data port of the HDMI interface of the external device and the source interface module.

With reference to the first possible implementation manner of the first aspect, the second possible implementation manner of the first aspect, and the third possible implementation manner of the first aspect, in a fourth possible implementation manner, the power supply submodule includes a power supply component configured to generate the constant voltage, or connect to a board power supply of a multimedia terminal on which the HDMI unit is located, a resistor component configured to separately connect to the power supply component and a ground end, and a first switch component configured to configured to under control of the processing module, disconnect or connect the power supply component from or to the power port on the HDMI interface of the external device.

With reference to the first possible implementation manner of the first aspect, the second possible implementation manner of the first aspect, the third possible implementation manner of the first aspect, and the fourth possible implementation manner of the first aspect, in a fifth possible implementation manner, the detection submodule includes a level signal input end configured to receive the level signal input by using the HPD pin on the HDMI interface of the external device, an HPD detection end configured to detect the level signal, an HPD output end configured to output the level signal, and a second switch component configured to under control of the processing module, establish a connection between the level signal input end and the HPD detection end, or a connection between the level signal input end and the HPD output end.

With reference to the first possible implementation manner of the first aspect, the second possible implementation manner of the first aspect, the third possible implementation manner of the first aspect, the fourth possible implementation manner of the first aspect, and the fifth possible implementation manner of the first aspect, in a sixth possible implementation manner, the switching circuit module includes a third switch component configured to under control of the processing module, establish the connection between the HDMI interface of the external device and the source interface module, or establish the connection between the HDMI interface of the external device and the sink interface module.

According to a second aspect, the present disclosure provides a multimedia terminal, including at least one HDMI unit provided by any embodiment of the present disclosure, where the HDMI unit is configured to connect to an HDMI interface of an external device of a source device type, or connect to an HDMI interface of an external device of a sink device type.

In a first possible implementation manner of the second aspect, the processing module in the HDMI unit is a central processing unit (CPU) of the multimedia terminal.

According to the HDMI unit and the multimedia terminal that are provided by the present disclosure, a processing module detects a device type of a connected external device, and controls, according to the identified device type, a switching circuit module to establish a connection between an HDMI interface of the external device and a source interface module, or establish a connection between an HDMI interface of the external device and a sink interface module, thereby implementing that a multimedia terminal identifies a device type of a connected external device, and establishes a connection between an HDMI interface of the external device and a source interface module or a sink interface module, and implementing that when a different type of a device connected to the multimedia terminal matches a port, it is ensured that the multimedia terminal establishes a connection to a source device or a sink device.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are a part rather than all of the embodiments of the present disclosure. All other embodiments obtained by persons of ordinary skill in the art based on the embodiments of the present disclosure without creative efforts shall fall within the protection scope of the present disclosure.

Figure 1:
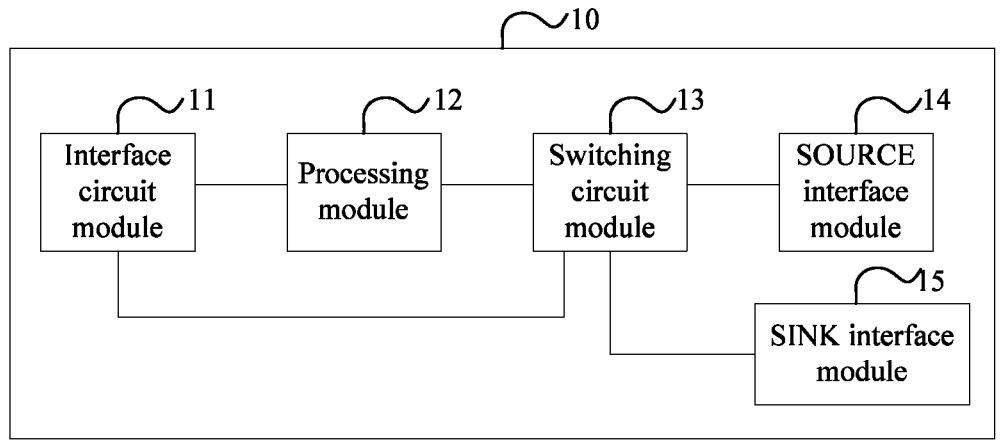
FIG. 1 is a schematic structural diagram of Embodiment 1 of a HDMI unit according to the present disclosure.

FIG. 1 is a schematic structural diagram of Embodiment 1 of a HDMI unit according to the present disclosure. As shown in FIG. 1, an HDMI unit 10 provided by an embodiment of the present disclosure includes a source interface module 14, a sink interface module 15, an interface circuit module 11, a processing module 12, and a switching circuit module 13.

The source interface module 14 is configured to communicate with an external device of a sink device type; the sink interface module 15 is configured to communicate with an external device of a source device type; the interface circuit module 11 is configured to connect to an HDMI interface of an external device; the processing module 12 is configured to identify a device type of the external device connected to the interface circuit module 11, and control the switching circuit module 13 according to the identified device type; and the switching circuit module 13 is configured to: under control of the processing module 12, establish a connection between the HDMI interface of the external device connected to the interface circuit module 11 and the source interface module 14, to implement communication between the external device of the sink type device and the source interface module 14, or establish a connection between the HDMI interface of the external device connected to the interface circuit module 11 and the sink interface module 15, to implement communication between the external device of the source type device and the sink interface module 15.

The HDMI interface of the external device is generally a plug, and the plug is electrically connected to the external device by using a cable. The interface circuit module 11 may match the HDMI interface of the external device in order to facilitate plugging of the HDMI interface of the external device into the interface circuit module 11. In a state in which the interface circuit module 11 is connected to the HDMI interface of the external device, the processing module 12 may identify the device type of the external device connected to the interface circuit module 11 as the sink device type or the source device type, thereby controlling, according to the identified device type, the switching circuit module 13. The switching circuit module 13 may, under control of the processing module 12, establish the connection between the switching circuit module 13 and the source interface module 14, or establish the connection between the switching circuit module 13 and the sink interface module 15. If the processing module 12 identifies the external device connected to the interface circuit module 11 as a sink device, the processing module 12 may control the interface circuit module 11 to establish a connection between the interface circuit module 11 and the source interface module 14, thereby implementing the connection between the HDMI interface of the external device and the source interface module 14; if the processing module 12 identifies the external device connected to the interface circuit module 11 as a source device, the processing module 12 may control the interface circuit module 11 to establish a connection between the interface circuit module 11 and the sink interface module 15, thereby implementing the connection between the HDMI interface of the external device and the sink interface module 15.

According to the HDMI unit provided by the embodiment of the present disclosure, a processing module detects a device type of a connected external device, and controls, according to the identified device type, a switching circuit module to establish a connection between an HDMI interface of the external device and a source interface module, or establish a connection between an HDMI interface of the external device and a sink interface module, thereby implementing that a multimedia terminal identifies a device type of a connected device, and establishes a connection between an HDMI interface of the external device and a source interface module or a sink interface module, and implementing that when a different type of a device connected to the multimedia terminal matches a port, it is ensured that the multimedia terminal establishes a connection to a source device or a sink device.

Figure 2:
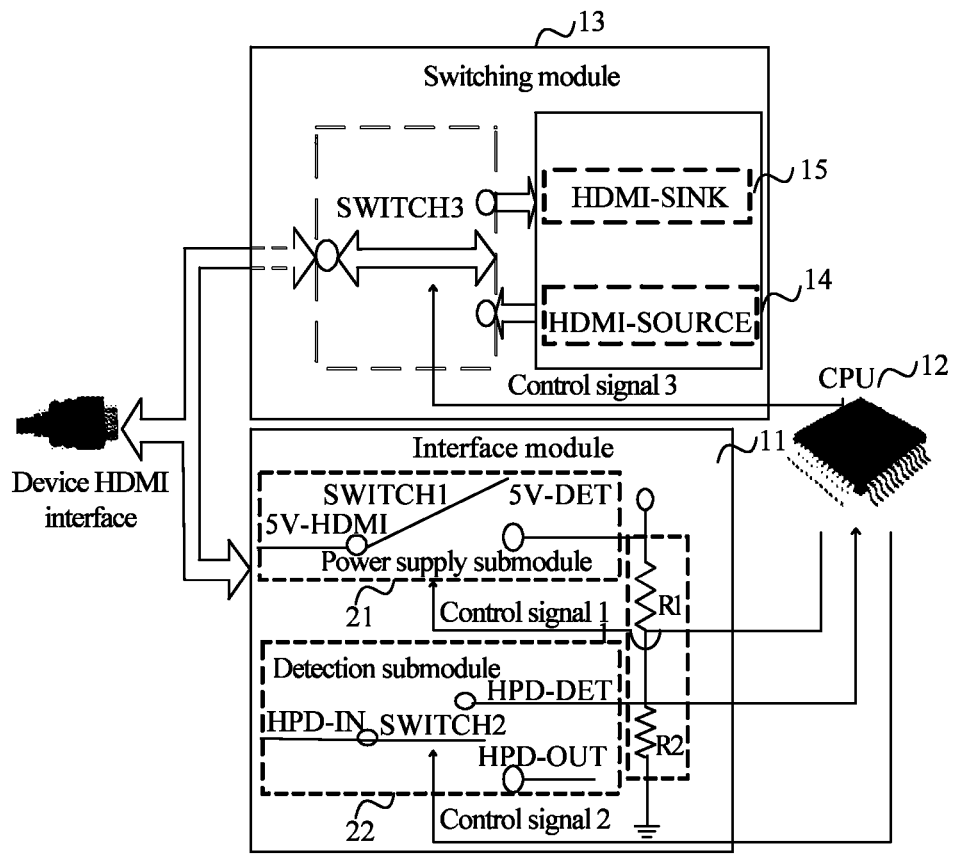
FIG. 2 is a principle diagram of a HDMI unit according to the present disclosure.

FIG. 2 is a principle diagram of a HDMI unit according to the present disclosure. As shown in FIG. 2, based on the technical solution of Embodiment 1 of the present disclosure, in the HDMI unit 10 provided by the embodiment of the present disclosure, optionally, the interface circuit module 11 may include: a power supply submodule 21 and a detection submodule 22.

The power supply submodule 21 is configured to connect to a power port on the HDMI interface of the external device, to provide a constant voltage for the HDMI interface of the external device; and the detection submodule 22 is configured to separately connect to an HPD pin on the HDMI interface of the external device and the processing module 12, to output a detected level signal that is from the HPD pin of the external device to the processing module 12.

Preferably, the power supply submodule 21 may be formed by a power supply component, a resistor component, and a first switch component. The power supply component is connected to the power port on the HDMI interface of the external device, and is configured to generate the constant voltage, or is connected to a board power supply of a multimedia terminal on which the HDMI unit 10 is located; the resistor component is configured to separately connect to the power supply component and a ground end; and the first switch component is configured to: under control of the processing module 12, disconnect or connect the power supply component from or to the power port on the HDMI interface of the external device.

FIG. 2 provides a feasible circuit structure of the power supply submodule 21, where the power supply component may be a power supply pin 5V-HDMI in FIG. 2, the resistor component may be a resistor R1 and a resistor R2 in FIG. 2, and the first switch component may be a switch SWITCH1 in FIG. 2.

After a system is powered, the switch SWITCH1 is in a closed state, that is, the power supply pin 5V-HDMI of the HDMI unit 10 is connected to a 5V power supply on a board of the multimedia terminal on which the HDMI unit 10 is located. When the HDMI interface of the external device is not connected, the level signal that is from the HPD pin is provided by the board of the multimedia terminal on which the HDMI unit 10 is located. Due to existence of the resistor component, the level signal that is from the HPD pin and detected by the detection submodule 22 is approximately 2.5V in this case, a value range of a resistance value of the resistor component may be 10 kilohms (kΩ) to 50 kΩ, and in this embodiment, the resistance value of the resistor component is set to 27 kΩ.

Preferably, the detection submodule 22 may include: a level signal input end, an HPD detection end, an HPD output end, and a second switch component. As shown in FIG. 2, the level signal input end is an HPD-IN in FIG. 2, the HPD detection end is an HPD-DET in FIG. 2, the HPD output end is an HPD-OUT in FIG. 2, and the second switch component is a SWITCH2 in FIG. 2. The level signal input end is configured to receive the level signal input by using the HPD pin on the HDMI interface of the external device; the HPD detection end is configured to detect the level signal; the HPD output end is configured to output the level signal; and the second switch component is configured to: under control of the processing module 12, connect the level signal input end to the HPD detection end or to the HPD output end.

A CPU in FIG. 2 is the processing module 12 in the HDMI unit 10 provided by the embodiment of the present disclosure. An AD pin of the CPU is connected to the detection submodule 22, and samples the received level signal, so that the CPU determines the device type of the external device according to the level signal.

Optionally, the processing module 12 may be configured to: acquire the level signal that is from the HPD pin by using the detection submodule 22; and if a level of the level signal is less than or equal to a first preset threshold, identify the external device as being of the source device type; or if a level of the level signal is greater than or equal to a second preset threshold, identify the external device as being of the sink device type.

After the system is powered, the switch SWITCH1 is in the closed state, that is, the 5V power supply on the HDMI interface is provided by the board of the multimedia terminal on which the HDMI unit 10 is located; and the SWITCH2 initially connects the HPD pin HPD-IN on the HDMI interface to the HPD-DET.

If the device type of the external device connected to the interface circuit module 11 is the source device, because inside the source device, the level signal is pulled down to the ground end by using a resistor, it can be learnt according to a circuit principle that the level of the level signal that is from the HPD pin of the HDMI interface of the source device may be reduced from 2.5V in an initial state to a value less than or equal to the first preset threshold, that is, the level of the level signal may be less than or equal to 2.2V (which is determined by a resistance value of the selected resistor); and if the device type of the external device connected to the interface circuit module 11 is the sink device, because inside the sink device, the level signal is pulled up to 5V by using a resistor, it can be learnt according to the circuit principle that the level of the level signal that is from the HPD pin of the HDMI interface of the sink device may rise from 2.5V in an initial state to a value greater than or equal to the second preset threshold, that is, the level of the level signal may be greater than or equal to 3.9V (which is determined by a resistance value of the selected resistor).

After the processing module 12 identifies the type of the external device connected to the interface circuit module 11, the SWITCH1 and the SWITCH2 need to be further controlled. If the external device is identified as the source device, the processing module 12 needs to control the switch SWITCH1 to open, and control the SWITCH2 to connect to the HPD-OUT, and to hand over the level signal that is from the HPD pin to an HDMI chip for processing, that is, the level signal that is from the HPD pin is switched to the sink interface module 15 by using the switching circuit module 13; and if the external device is the sink device, the processing module 12 continues to keep the switch SWITCH1 closed and the SWITCH2 connected to the HPD-OUT, so that the level signal that is from the HPD pin is switched to the source interface module 14 by using the switching circuit module 13.

Further, the processing module 12 may be further configured to: if the external device is identified as being of the source device type, control the switching circuit module 13 to establish a connection between a data port of the HDMI interface of the external device and the sink interface module 15; or if the level of the level signal is greater than or equal to the second preset threshold, identify the external device as being of the sink device type, and control the switching circuit module 13 to establish a connection between a data port of the HDMI interface of the external device and the source interface module 14.

Optionally, the switching circuit module 13 may include a third switch component configured to, under control of the processing module 12, establish the connection between the HDMI interface of the external device and the source interface module 14, or establish the connection between the HDMI interface of the external device and the sink interface module 15.

The third switch component may be a switch SWITCH3 in FIG. 2, the source interface module 14 may be an HDMI-source in FIG. 2, and the sink interface module 15 may be an HDMI-sink in FIG. 2.

After the interface circuit module 11 is connected to the HDMI interface of the external device, the pin HPD-DET may detect the level of the level signal that is from the HPD pin of the HDMI interface of the external device; if the level of the level signal is less than or equal to 2.2V (which is determined by the resistance value of the selected resistor), the device type of the external device is identified as the source device, and the processing module 12 controls the switch SWITCH3 to connect the HDMI interface of the external device to the HDMI-sink.

If the level of the level signal detected by the pin HPD-DET is greater than or equal to 3.9V (which is determined by the resistance value of the selected resistor), the device type of the external device is identified as the sink device, and the processing module 12 controls the switch SWITCH3 to connect the HDMI interface of the external device to the HDMI-source.

According to the HDMI unit provided by the embodiment of the present disclosure, a device type of an external device is identified by detecting a change in a level of a level signal that is from an HPD pin of an HDMI interface of the external device, and a processing module controls corresponding actions of a first switch component, a second switch component, and a third switch component, thereby implementing that when a different type of a device connected to a multimedia terminal matches a port, it is ensured that the multimedia terminal establishes a connection to a source device or a sink device.

Another embodiment of the present disclosure provides a multimedia terminal, including the HDMI unit 10 provided by any one of foregoing embodiments, where the HDMI unit 10 is configured to connect to an HDMI interface of an external device of a source device type, or connect to an HDMI interface of an external device of a sink device type.

A processing module 12 in the HDMI unit 10 may be a CPU of the multimedia terminal.

The multimedia terminal provided by the embodiment may include a HDMI unit, resolving a problem that a multimedia device cannot establish a connection to a source device or a sink device when a type of an external device connected to a multimedia terminal does not match a port type.

Persons of ordinary skill in the art may understand that all or a part of the steps of the method embodiments may be implemented by a program instruction relevant hardware. The foregoing program may be stored in a computer readable storage medium. When the program runs, the steps of the method embodiments are performed. The foregoing storage medium includes: any medium that can store program code, such as a read-only memory (ROM), a random access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A high-definition multimedia interface (HDMI) unit, comprising:
    a switching circuit;
    an interface circuit configured to connect to an HDMI interface of an external device; and
    a processor coupled to the switching circuit and the interface circuit and configured to:
        identify a device type of the external device connected to the interface circuit; and
        control the switching circuit according to the identified device type,
    wherein the switching circuit is configured to:
        establish a connection between the HDMI interface of the external device connected to the interface circuit and a source interface circuit under control of the processor when the external device is a source device type; and
        establish a connection between the HDMI interface of the external device connected to the interface circuit and a sink interface circuit under control of the processor when the external device is a sink device type,
    wherein the source interface circuit enables the HDMI unit to communicate with a source device type,
    wherein the sink interface circuit enables the HDMI unit to communicate with a sink device type,
    wherein the interface circuit comprises a power supply configured to connect to a power port on the HDMI interface of the external device, wherein the power supply is configured to provide a constant voltage for the HDMI interface of the external device, wherein the interface circuit is further configured to:
        separately connect to a hot plug detection (HPD) pin on the HDMI interface of the external device and the processor; and
        output a level signal from the HPD pin of the external device to the processor, and
    wherein the processor is further configured to:
        acquire the level signal from the HPD pin;
        identify the external device as being of the source device type when a level of the level signal is less than or equal to a first preset threshold; and
        identify the external device as being of the sink device type when a level of the level signal is greater than or equal to a second preset threshold.

2. The HDMI unit according to claim 1, wherein the processor is further configured to:
    control the switching circuit to establish a connection between a data port of the HDMI interface of the external device and the sink interface circuit when the external device is identified as being of the source device type; and
    control the switching circuit module to establish a connection between a data port of the HDMI interface of the external device and the source interface circuit when the external device is the sink device type.

3. The HDMI unit according to claim 1, wherein the processor is further configured to:
    control the switching circuit to establish a connection between a data port of the HDMI interface of the external device and the sink interface circuit when the external device is identified as being of the source device type; and control the switching circuit to establish a connection between the data port of the HDMI interface of the external device and the source interface circuit when the level of the level signal is greater than or equal to the second preset threshold.

4. The HDMI unit according to claim 1, wherein the power supply comprises:
a power supply component configured to connect to a board power supply of a multimedia terminal on which the HDMI unit is located;
a resistor component configured to separately connect to the power supply component and a ground end; and
a first switch component configured to connect the power supply component to the power port on the HDMI interface of the external device under control of the processor.

5. The HDMI unit according to claim 1, wherein the power supply comprises:
a power supply component configured to connect to a board power supply of a multimedia terminal on which the HDMI unit is located;
a resistor component configured to separately connect to the power supply component and a ground end; and
a first switch component configured to connect the power supply component to the power port on the HDMI interface of the external device under control of the processor.

6. The HDMI unit according to claim 2, wherein the power supply comprises:
a power supply component configured to connect to a board power supply of a multimedia terminal on which the HDMI unit is located;
a resistor component configured to separately connect to the power supply component and a ground end; and
a first switch component configured to connect the power supply component from or to the power port on the HDMI interface of the external device under control of the processor.

7. The HDMI unit according to claim 1, wherein the interface circuit being configured to output the level signal from the HPD pin of the external device to the processor comprises:
a level signal input end configured to receive the level signal using the HPD pin on the HDMI interface of the external device;
an HPD detection end configured to detect the level signal;
an HPD output end configured to output the level signal; and
a second switch component configured to:
establish a connection between the level signal input end and the HPD detection end; and
establish a connection between the level signal input end and the HPD output end under control of the processor.

8. The HDMI unit according to claim 1, wherein the interface circuit being configured to output the level signal from the HPD pin of the external device to the processor comprises:
a level signal input end configured to receive the level signal using the HPD pin on the HDMI interface of the external device;
an HPD detection end configured to detect the level signal;
an HPD output end configured to output the level signal; and
a second switch component configured to:
establish a connection between the level signal input end and the HPD detection end; and
establish a connection between the level signal input end and the HPD output end under control of the processor.

9. The HDMI unit according to claim 2, wherein the interface circuit being configured to output the level signal from the HPD pin of the external device to the processor comprises:
a level signal input end configured to receive the level signal using the HPD pin on the HDMI interface of the external device;
an HPD detection end configured to detect the level signal;
an HPD output end configured to output the level signal; and
a second switch component configured to:
establish a connection between the level signal input end and the HPD detection end; and
establish a connection between the level signal input end and the HPD output end under control of the processor.

10. The HDMI unit according to claim 4, wherein the interface circuit being configured to output the level signal from the HPD pin of the external device to the processor comprises:
a level signal input end configured to receive the level signal using the HPD pin on the HDMI interface of the external device;
an HPD detection end configured to detect the level signal;
an HPD output end configured to output the level signal; and
a second switch component configured to:
establish a connection between the level signal input end and the HPD detection end; and
establish a connection between the level signal input end and the HPD output end under control of the processor.

11. The HDMI unit according to claim 1, wherein the switching circuit comprises a third switch component configured to establish the connection between the HDMI interface of the external device and the source interface circuit under control of the processor.

12. The HDMI unit according to claim 1, wherein the switching circuit comprises a third switch component configured to establish the connection between the HDMI interface of the external device and the sink interface circuit under control of the processor.

13. The HDMI unit according to claim 1, wherein the switching circuit comprises a third switch component configured to establish the connection between the HDMI interface of the external device and the source interface circuit under control of the processor.

14. The HDMI unit according to claim 1, wherein the switching circuit comprises a third switch component configured to establish the connection between the HDMI interface of the external device and the sink interface circuit under control of the processor.

15. The HDMI unit according to claim 1, wherein the switching circuit comprises a third switch component configured to:
establish the connection between the HDMI interface of the external device and the source interface circuit; and establish the connection between the HDMI interface of the external device and the sink interface circuit under control of the processor.

16. A multimedia terminal comprising at least one high-definition multimedia interface (HDMI) unit, wherein the HDMI unit is configured to connect to an HDMI interface of an external device of a source device type, and wherein the HDMI unit comprises:
- a switching circuit;
- an interface circuit configured to connect to an HDMI interface of an external device; and
- a processor coupled to the switching circuit and and the interface circuit and configured to:
  - identify a device type of the external device connected to the interface circuit; and
  - control the switching circuit according to the identified device type,
- wherein the switching circuit is configured to establish a connection between the HDMI interface of the external device connected to the interface circuit and a source interface circuit under control of the processor when the external device is a source device type,
- wherein the source interface circuit enables the HDMI unit to communicate with a source device type,
- wherein the interface circuit comprises a power supply configured to connect to a power port on the HDMI interface of the external device, wherein the power supply is configured to provide a constant voltage for the HDMI interface of the external device, wherein the interface circuit is further configured to:
  - separately connect to a hot plug detection (HPD) pin on the HDMI interface of the external device and the processor; and
  - output a level signal from the HPD pin of the external device to the processor, and
- wherein the processor is further configured to:
  - acquire the level signal from the HPD pin;
  - identify the external device as being of the source device type when a level of the level signal is less than or equal to a first preset threshold; and
  - identify the external device as being of the sink device type when a level of the level signal is greater than or equal to a second preset threshold.

17. A multimedia terminal, comprising a high-definition multimedia interface (HDMI) unit configured to connect to an HDMI interface of an external device of a sink device type, wherein the HDMI unit comprises:
- a switching circuit;
- an interface circuit configured to connect to an HDMI interface of an external device; and
- a processor coupled to the switching circuit and the interface circuit and configured to:
  - identify a device type of the external device connected to the interface circuit; and
  - control the switching circuit according to the identified device type,
- wherein the switching circuit is configured to establish a connection between the HDMI interface of the external device connected to the interface circuit and a sink interface circuit under control of the processor when the external device is a sink device type,
- wherein the sink interface circuit enables the HDMI unit to communicate with a sink device type,
- wherein the interface circuit comprises a power supply configured to connect to a power port on the HDMI interface of the external device, wherein the power supply is configured to provide a constant voltage for the HDMI interface of the external device, wherein the interface circuit is further configured to:
  - separately connect to a hot plug detection (HPD) pin on the HDMI interface of the external device and the processor; and
  - output a level signal from the HPD pin of the external device to the processor, and
- wherein the processor is further configured to:
  - acquire the level signal from the HPD pin;
  - identify the external device as being of the source device type when a level of the level signal is less than or equal to a first preset threshold; and
  - identify the external device as being of the sink device type when a level of the level signal is greater than or equal to a second preset threshold.

18. The multimedia terminal according to claim 17, wherein the processor in the HDMI unit is a central processing unit (CPU) of the multimedia terminal.

* * * * *

UNITED STATES PATENT AND TRADEMARK OFFICE
CERTIFICATE OF CORRECTION

PATENT NO. : 9,807,451 B2
APPLICATION NO. : 14/828822
DATED : October 31, 2017
INVENTOR(S) : Yingqi Xu et al.

Page 1 of 1

It is certified that error appears in the above-identified patent and that said Letters Patent is hereby corrected as shown below:

In the Claims

Column 8, Lines 53-63, Claim 2 should read:
2. The HDMI unit according to claim 1, wherein the processor is further configured to:
    control the switching circuit to establish a connection between a data port of the HDMI interface of the external device and the sink interface circuit when the external device is identified as being of the source device type; and
    control the switching circuit to establish a connection between a data port of the HDMI interface of the external device and the source interface circuit when the external device is the sink device type.

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*